United States Patent
Ghosh

(10) Patent No.: US 8,300,712 B2
(45) Date of Patent: Oct. 30, 2012

(54) EQUALIZATION FOR ZERO PREFIX OFDM SYSTEMS

(75) Inventor: Monisha Ghosh, Chappaqua, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1256 days.

(21) Appl. No.: 12/067,352

(22) PCT Filed: Sep. 22, 2006

(86) PCT No.: PCT/IB2006/053452
§ 371 (c)(1),
(2), (4) Date: Mar. 19, 2008

(87) PCT Pub. No.: WO2007/034449
PCT Pub. Date: Sep. 29, 2007

(65) Prior Publication Data
US 2008/0273611 A1 Nov. 6, 2008

Related U.S. Application Data

(60) Provisional application No. 60/720,087, filed on Sep. 23, 2005.

(51) Int. Cl.
*H04K 1/10* (2006.01)
*H04L 27/28* (2006.01)
(52) U.S. Cl. ................................ 375/260; 375/259
(58) Field of Classification Search .......... 375/260, 375/259
See application file for complete search history.

(56) References Cited

U.S. PATENT DOCUMENTS

| 2004/0174809 A1 | 9/2004 | Shor |
| 2005/0031018 A1 | 2/2005 | Papadimitriou |
| 2006/0035593 A1* | 2/2006 | Leeds ................. 455/67.13 |
| 2006/0159187 A1* | 7/2006 | Wang et al. ............ 375/260 |

FOREIGN PATENT DOCUMENTS

| EP | 1178642 A2 | 6/2002 |
| EP | 1276251 A1 | 1/2003 |
| WO | WO 2004044689 A2 * | 5/2004 |

OTHER PUBLICATIONS

N. Wang et al, "Adaptive Zero Padding OFDM over Frequency Selective Multipath Channels", Eurasip Journal on Applied Signal Processing, vol. 2004, No. 10, Aug. 2004, pp. 1478-1488, XP002422208.
B. Muquet et al., "Cyclic Prefixing or Zero Padding for Wireless Multicarrier transmissions", IEEE Transactions on Communications, IEEE Service Center, Piscataway, NJ, vol. 50, No. 12, Dec. 2002, XP011071075.

* cited by examiner

*Primary Examiner* — David C. Payne
*Assistant Examiner* — Brian J Stevens
(74) *Attorney, Agent, or Firm* — Larry Lieberchuk

(57) ABSTRACT

The system, apparatus, and method (300) of the present invention provide sub-optimal channel equalization techniques for zero-prefixed orthogonal frequency division modulation (OFDM) systems that retain the performance of least-squares equalization but are not as complex. The technique of the present invention improves equalization performance with less complexity than required by minimum-mean-squared-error (MMSE) equalization as well. The channel matrix is rendered circulant and then truncated where the eigenvalues are small.

21 Claims, 3 Drawing Sheets

M: AT LEAST $N+N_g$ WHERE N IS THE IFFT SIZE USED IN THE TRANSMITTER AND $N_g$ IS THE LENGTH OF THE ZERO-PREFIX

M: AT LEAST N+N$_g$ WHERE N IS THE IFFT SIZE USED IN THE TRANSMITTER AND N$_g$ IS THE LENGTH OF THE ZERO-PREFIX

EQUALIZATION FOR ZERO PREFIX OFDM SYSTEMS

This invention provides a system, apparatus and method for improved equalization in zero-prefix orthogonal frequency division multiplexing (OFDM) carriers.

A typical OFDM system uses a cyclic-prefix, i.e., an N sample OFDM symbol is cyclically extended by $N_G$ samples where $N_G > L_h$, and $L_h$ is the length of the channel impulse response.

In a zero-prefix OFDM system, multipath protection is obtained by inserting NG zero samples between OFDM symbols instead of cyclically extending the symbol itself.

The main advantage of zero-prefix OFDM system over a cyclic-prefix system is that the total transmitted energy is reduced in a zero-prefix OFDM system.

However, equalization at the receiver is changed because the convolution of the channel with the OFDM symbol is now a linear convolution as opposed to a cyclic convolution in the case of a cyclic-prefix system. On the other hand, with proper processing, e.g., least-squares equalization, the performance of the zero-prefix system can be substantially improved, especially in channels that exhibit channel-nulls. However, least-squares methods are complex to implement.

The system, apparatus, and method of the present invention provide sub-optimal channel equalization techniques for zero-prefix orthogonal frequency division modulation (OFDM) systems that retain the performance of least-squares equalization but are not as complex. The technique of the present invention improves equalization performance with less complexity that required by minimum-mean-squared-error (MMSE) equalization as well.

In a first embodiment the system, apparatus, and method of the present invention employs a suboptimal least-square estimator.

In a second embodiment, the system, apparatus, and method of the present invention employs a truncated sub-optimal estimator derived by omitting values corresponding to received samples since the system of equations on which the first embodiment is based is over-determined, i.e., has more observed values than unknowns. An alternative of the second embodiment employs pre-stored matrices indexed and retrievable thereby, based on the pattern required by an actual channel.

In a third embodiment, a further simplification eliminates non-diagonal channel-dependent matrix inversions.

Figure 1:
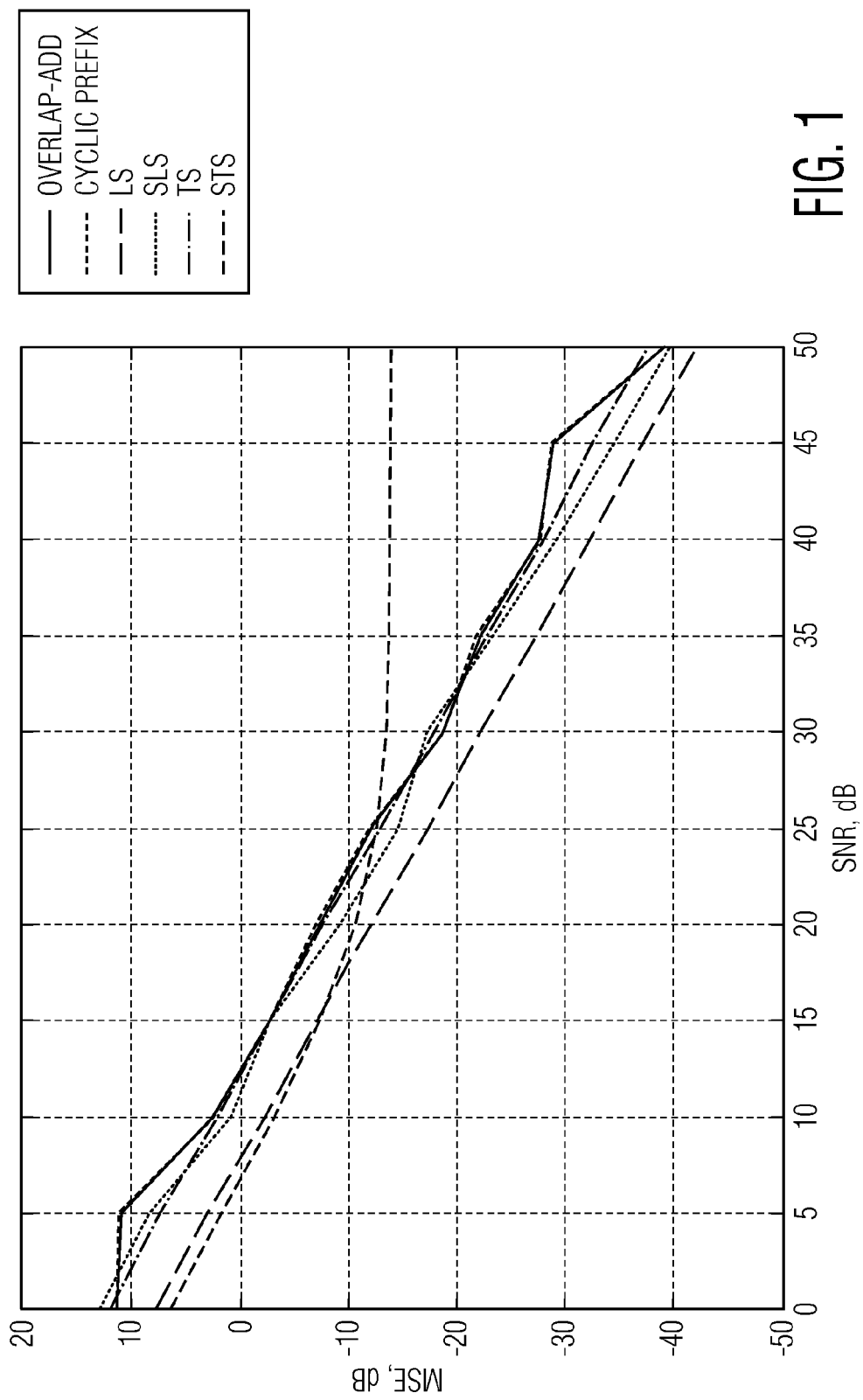
FIG. 1 illustrates mean squared error (MSE) performance for different estimators in an exponentially faded Rayleigh channel with 68 ns rms delay spread.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

In a generalized approach employing a least-squares estimator, for any L, an L×L Fourier matrix is defined as follows:

$$F_L(i+1, j+1) = \frac{1}{\sqrt{L}} e^{-j2\pi ij/L} \quad i, j = 0, 1, \ldots, L-1 \quad (1)$$

Let the data vector of length N be $$a = [a_0 a_1 \ldots a_N]^T$$

and the OFDM symbol derived by taking the IFFT of a be $$A = [A_0 A_1 \ldots A_N]^T.$$

Then we can write $$A = F_N^H a$$

where $F_N$ is the N×N Fourier matrix as defined above. The vector A is extended by $N_G$ zeroes, where $N_G$ is the length of the guard interval, and then transmitted over a channel with impulse response denoted by $$h = [h_0 h_1 \ldots h_{N_G}]^T.$$

The total number of received samples available to process the transmitted data vector is therefore $$N + N_G.$$

The received vector r can be expressed in terms of the channel h and transmitted vector A as follows:

$$\begin{bmatrix} r_0 \\ r_1 \\ \vdots \\ r_{N-1} \\ \vdots \\ r_{N+N_G-1} \end{bmatrix} = \begin{bmatrix} h_0 & 0 & \ldots & 0 & \ldots & 0 \\ h_1 & h_0 & \ldots & 0 & \ldots & 0 \\ \vdots & \vdots & \vdots & \vdots & \vdots & \vdots \\ 0 & 0 & \ldots & h_{N_G} & \ldots & h_0 \\ \vdots & \vdots & \vdots & \vdots & \vdots & \vdots \\ 0 & 0 & \ldots & 0 & \ldots & h_{N_G} \end{bmatrix} \begin{bmatrix} A_0 \\ A_1 \\ \vdots \\ A_{N-1} \end{bmatrix} + \begin{bmatrix} n_0 \\ n_1 \\ \vdots \\ n_{N-1} \\ \vdots \\ n_{N-N_G-1} \end{bmatrix} \quad (2)$$

By padding the vector A with $N_G$ zeroes, the above equation can be rewritten in such a way that the channel matrix is a circulant, as follows:

$$\begin{bmatrix} r_0 \\ r_1 \\ \vdots \\ r_{N-1} \\ \vdots \\ r_{N+N_G-1} \end{bmatrix} = \begin{bmatrix} h_0 & 0 & \ldots & 0 & h_{N_G} & \ldots & h_2 & h_1 \\ h_1 & h_0 & \ldots & 0 & 0 & h_{N_G} & \ldots & h_2 \\ \vdots & \vdots & \vdots & \vdots & \vdots & \vdots & \vdots & \vdots \\ 0 & 0 & \ldots & h_{N_G} & \ldots & h_0 & \ldots & 0 \\ \vdots & \vdots & \vdots & \vdots & \vdots & \vdots & \vdots & \vdots \\ 0 & 0 & \ldots & 0 & \ldots & h_{N_G} & \ldots & h_0 \end{bmatrix} \begin{bmatrix} A_0 \\ A_1 \\ \vdots \\ A_{N-1} \\ \vdots \\ 0 \end{bmatrix} + \begin{bmatrix} n_0 \\ n_1 \\ \vdots \\ n_{N-1} \\ \vdots \\ n_{N-N_G-1} \end{bmatrix} \quad (3)$$

Equations (2) and (3) are identical. However, the representation in equation (3) allows the use of the property that eigenvalues of a circulant matrix are the FFT of the first column of the circulant matrix and the eigenvector matrix is the Fourier matrix. Equation (3) can be rewritten as $$r = H_C \begin{bmatrix} A \\ 0 \end{bmatrix} + \underline{n} \quad (4)$$

where $H_C$ is the N+$N_G$ dimensional square circulant channel matrix shown above. It follows that:

$$H_C = \sqrt{N+N_G} F_{N+N_G}{}^H \Lambda F_{N+N_G} \quad (5)$$

where $F_{N+N_G}$ is the Fourier matrix of dimension N+$N_G$, and $\Lambda$ is a diagonal matrix of eigenvalues $\lambda_i$ of $H_C$. These eigenvalues are also the FFT of the channel, i.e., $$\begin{bmatrix} \lambda_0 \\ \lambda_1 \\ \vdots \\ \lambda_{N+N_G-1} \end{bmatrix} = F_{N+N_G} \begin{bmatrix} h_0 \\ h_1 \\ \vdots \\ h_{N+N_G-1} \end{bmatrix} \quad (6)$$

where the channel h is assumed to have only the first $N_G$+1 values that are non-zero. From equations (3), (4) and (5) the received vector r can be written directly in term of the transmitted vector a as follows:

$$r = \sqrt{N+N_G} F_{N+N_G}{}^H \Lambda F_{N+N_G}(:,1:N) F_N{}^H \underline{a} + \underline{n} \quad (7)$$

where $F_{N+N_G}(:,1:N)$ is a (N+$N_G$)×N matrix containing only the first N columns of $F_{N+N_G}$. Taking the FFT of r is equivalent to multiplying by the Fourier matrix $F_{N+N_G}$. Doing this, and dividing both sides of equation (7) by $\sqrt{N+N_G}$ yields:

$$\underline{R} = \Lambda F_{N-N_G}(:,1:N) F_N^H \underline{a} + \underline{N} \quad (8)$$

$$= \Lambda G \underline{a} + \underline{N}$$

where $G=F_{N+N_G}(:,1:N)F_N{}^H$ and $$\underline{N} = \frac{1}{N+N_G} F_{N+N_G} \underline{n}$$

is still additive white Gaussian noise (AWGN). A number of different estimators for a can be derived, as illustrated in the following sections.

A least-squares estimator for a has been described by B. Muquet, et al., *Cyclic Prefixing or Zero Padding for Wireless Multicarrier Transmissions?*, IEEE Trans on Comm., Vol. 50, No. 12, December 2002 and can be written as follows $$\hat{a}_{LS} = (G^H \Lambda^H \Lambda G)^{-1} G^H \Lambda^H R \quad (9)$$

which requires inversion of a channel-dependent matrix that is not a diagonal matrix and thus incurs an extra implementation cost over an FFT-based CP-OFDM receiver.

In order to overcome this extra computational cost, Muquet, et al., supra, disclose suboptimal, low-complexity equalization schemes that target practical ZP-OFDM receivers.

Again, from equation (8), Muquet, et al. derive a suboptimal least-squares (SLS) estimator by first multiplying R by $\Lambda^{-1}$, and then deriving a least-square estimator for a while noticing that $G^H G = I_N$ to arrive at $$\hat{a}_{SLS} = G^H \Lambda^{-1} R \quad (10)$$

While this is a much easier estimator to implement since G is a know matrix and the only inverse required is that of the diagonal matrix of channel frequency values, if there is a channel null, i.e., any of the $\lambda_i$ are close to zero, the estimate error will be high.

The present invention provides two estimators that are simpler computationally and which avoid noise enhancement. Equation (8) is an overdetermined set of equations with N+$N_G$ observables and N unknowns. Hence, some of the received values in R can be omitted. Obviously it makes sense to omit those values that correspond to small values of $\lambda_i$. Denoting the truncated quantities with the subscript T leads to $$R_T = \Lambda_T G_T a + N_T \quad (11)$$

which yields the following truncated suboptimal (TS) estimator $$\hat{a}_{TS} = (G_T{}^H G_T)^{-1} G_T{}^H \Lambda_T{}^{-1} R_t \quad (12)$$

which is simpler to implement than the least-squares (LS) estimator of equation (9) since the matrix $\Lambda_T$ has been truncated to remove the small eigenvalues, taking the inverse does not cause excessive noise enhancement. However, a matrix inverse is still required that indirectly depends on the channel, since the rows of G that are removed to form $G_T$ depend on which of the $\lambda_i$ are small. In a preferred embodiment, the matrix $$(G_T{}^H G_T)^{-1} G_T{}^H$$

is computed and stored in a persistent memory for different combination of removed rows and then is retrieved from this memory depending on the pattern required by the actual channel.

In another preferred embodiment, a further simplification is made to the truncated suboptimal estimator of equation (12) by assuming that $G_T{}^H G_T$ is an identity matrix and arriving at the simplified truncated suboptimal (STS) estimator $$\hat{a}_{TS} = G_T{}^H \Lambda_T{}^{-1} R_t \quad (13)$$

which is very simple to implement since there are no non-diagonal channel-dependent matrix inversions required. Even though this estimator is clearly non-optimal since $G_T{}^H G_T$ is not an identity matrix, simulations (discussed below) show that for low signal-to-noise ratios (<20 DB), this estimator performs very near to the performance of the least-squares (LS) estimator of (9), even in channels with spectral nulls.

Simulations were done to compare the estimators with the metric chosen for the comparison as the mean-squared-error (MSE) defined as $$MSE = E[|a-\hat{a}|^2]$$

the OFDM parameters were chosen to be N=64 and $N_G$=16. the channel was assumed to be perfectly known at the receiver. In practice, channel estimates can be obtained by training sequences sent prior to data transmission.

FIG. 1 illustrates the performance in an exponentially faded Rayleigh channel with 68 ns delay spread. Assuming a sample rate of 22 MHz, this results an impulse response length of 16. A simulation was performed with 1000 different channel realizations and 100 OFDM symbols for each realization. The performance of the commonly used overlap-add (OLA) method for zero-prefix OFDM as well as the cyclic-prefix (CP) OFDM is included for comparison purposes. The performance of the LS estimator described above is about 5 DB better than the overlap-add (OLA) and cyclic-prefix (CP) systems, both of which have about the same performance. The TS and STS estimators omit the 2 smallest eigenvalues in the formation of $G_T$ and $\Lambda_T$. The Ts estimator performance is almost the same as the SLS estimator. The STS estimator that omits the 2 smallest frequency responses (or eigenvalues)

performs almost as well and even marginally better than both the LS and TS estimators at SNRs less than 20 dB, saturating at the higher SNRs. This indicates that in systems where the operating SNR is <20 dB, the extremely simple STS estimator can be used to obtain a 5 dB improvement over the Overlap-add (OLA) method.

Figure 2:
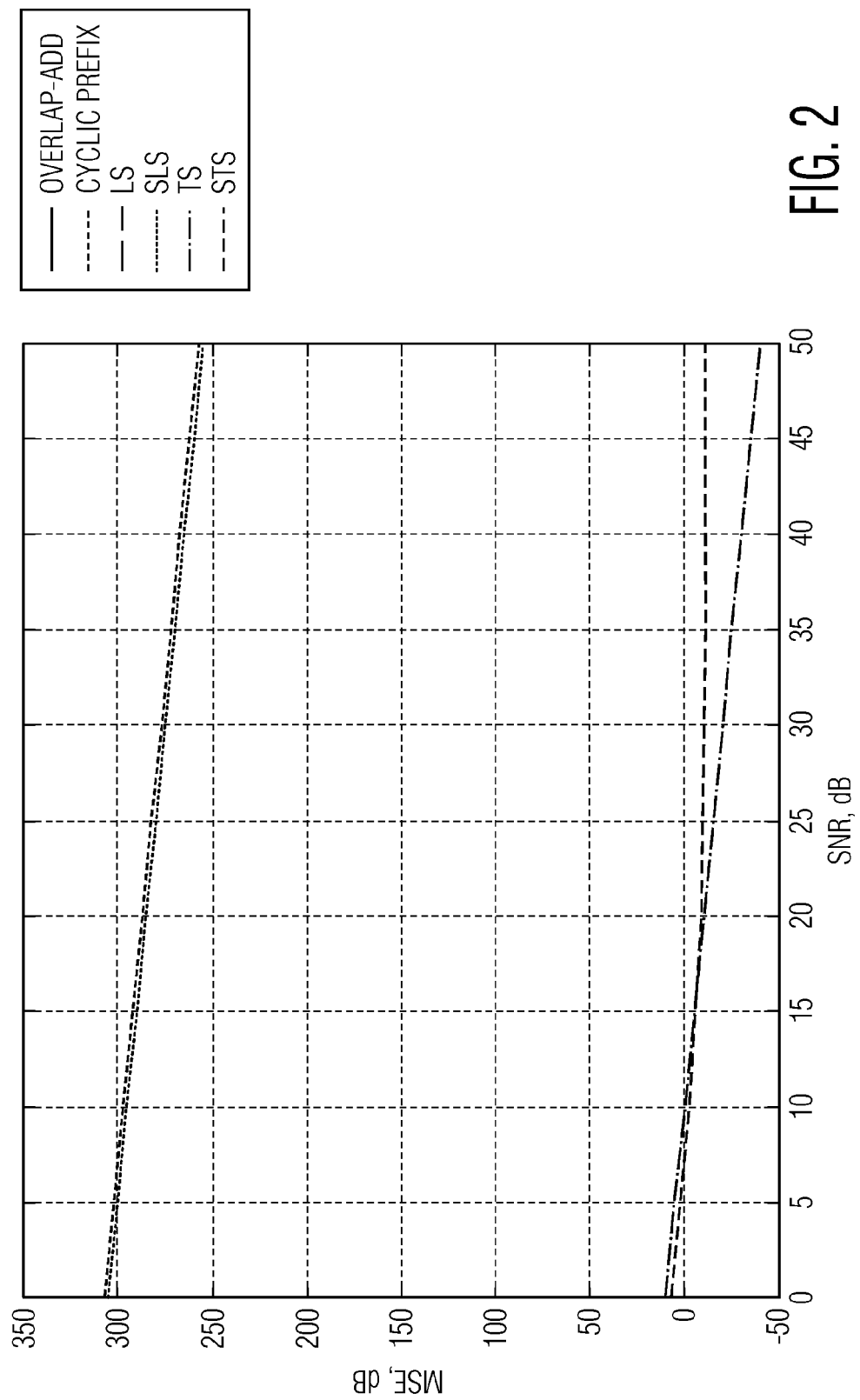
FIG. 2 illustrates mean squared error (MSE) performance for different estimators in $h=[1\ 0\ 0\ 0\ 1]^T$ channel.

FIG. 2 illustrates a performance comparison in a channel defined by h=[1 0 0 0 1]$^T$. This channel has 4 nulls in the spectral domain and hence the TS and STS estimators omit the 4 smallest eigenvalues. Here, a dramatic difference in performance is seen between the estimators. All the estimators that involve direct inversion of the full $\Lambda$ matrix, e.g., overlap-add (OLA), cyclic-prefix (CP), and SLS, perform very poorly due to the noise enhancement caused by the spectral nulls. Here again, the STS estimator at low SNRs is very comparable to the LS and TS estimators.

Figure 3:
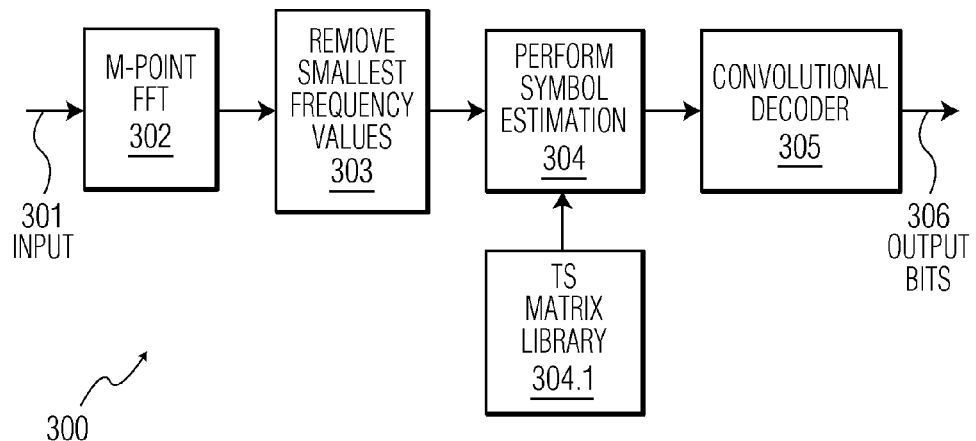
FIG. 3 illustrates a receiver apparatus modified according to the present invention.

Referring now to FIG. 3, a receiver 300 according to the present invention includes a module 302 to perform an M-point FFT on a received signal, followed by determination and removal of the smallest frequency values 303, where M=N+$N_G$. Symbol estimation is performed at 304 using one of a truncated suboptimal (TS) estimator (12) and a simplified truncated suboptimal (STS) estimator (13).

Figure 4:
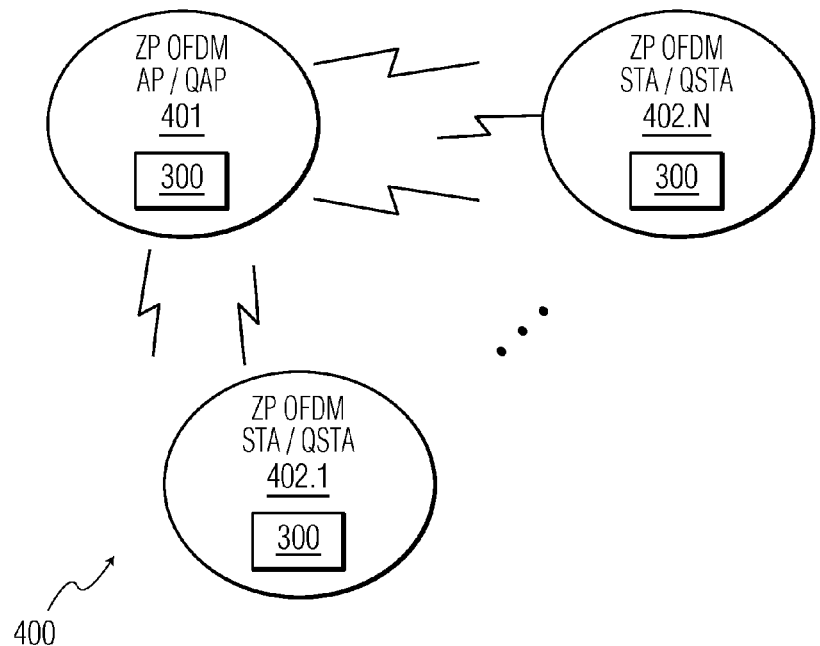
FIG. 4 illustrates a system of networked wireless devices wherein each device includes an apparatus modified according to the present invention.

FIG. 4 illustrates a typical wireless network comprising a AP/QAP 401 and a plurality of STA/QSTA 402.i devices incorporating the receiver apparatus 300.

The simplified estimator for zero-prefix (ZP) OFDM, developed above, works very well at low SNRs, which is of special interest for UWB systems. A larger FFT (N+$N_G$ as opposed to N) is required to implement this estimator. In practice, it may be more efficient to use a 2N FFT instead of N+$N_G$, if the latter is not a power of 2.

While the preferred embodiments of the present invention have been illustrated and described, it will be understood by those skilled in the art, the protocol applications as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling with the scope of the appended claims.

I claim:

1. A method of estimating a transmitted data vector a=[$a_0 a_1 \ldots a_N$]$^T$ of length N, comprising:
    receiving a transmission over a channel $H_C$ of a data vector R as a zero-prefixed OFDM symbol A=[$A_0 A_1 \ldots A_N 0 \ldots 0$]$^T$ having $N_G$ zeros, where $N_G$ is the length of a guard interval;
    computing eigenvalues of the channel $H_C$ with an M-point FFT where M=N+$N_G$;
    removing smallest frequency values from the received vector based on the computed eigenvalues to obtain truncated received data vector $R_T$;
    performing symbol estimation based on the truncated received data vector $R_T$; and
    decoding the estimated symbol.

2. The method of claim 1, wherein:
    the removing further comprises:
    i. determining a pattern of the channel wherein, for $N_G$ eigenvalues an eigenvalue of the FFT of the channel is null when the eigenvalue satisfies a pre-specified condition for null equality, and
    ii. truncating the received vector R to a vector $R_T$ by omission of the $N_G$ components thereof that correspond to the determined null eigenvalues; and
    the performing further comprises:
    iii. obtaining a truncated suboptimal estimator matrix based on the determined pattern, and
    iv. estimating a by pre-multiplying the truncated vector $R_T$ by the obtained truncated suboptimal estimator matrix.

3. The method of claim 2, wherein the OFDM symbol is an IFFT of a padded with $N_G$ zeros, the IFFT being the inverse Fourier transform of the FFT of the channel H.

4. The method of claim 2, further comprising:
    providing a library of at least one truncated suboptimal estimator matrix having removed rows that correspond to a pattern of null eigenvalues of the FFT of the channel; and
    wherein said obtaining further comprises first selecting the suboptimal estimator matrix from the provided library using the determined pattern.

5. The method of claim 4, wherein providing a library of at least one truncated suboptimal estimator matrix further comprises:
    for different combinations of removed rows that form a truncated pattern T, pre-storing in the library the result of the calculation $$(G_T^H G_T)^{-1} G_T^H \Lambda_T^{-1}$$

where
    $\Lambda_T$=matrix of diagonal eigenvalues of $H_C$ that has been truncated to remove null eigenvalues,
    A=$F_N^H$a, A=[$A_0 A_1 \ldots A_N 0 \ldots 0$]$^T$ is obtained by taking an IFFT of
    a=[$a_0 a_1 \ldots a_N$]$^T$, where IFFT is the inverse Fourier transform of the FFT of the channel H,
    $F_N$ is the N×N Fourier matrix $$F_L(i+1, j+1) = \frac{1}{\sqrt{N}} e^{-j2\pi ij/L} \quad i, j = 0, 1, \ldots, N-1,$$

$F_{N+N_G}$ of dimension N+$N_G$,
    $\Lambda$ is a diagonal matrix of eigenvalues $\lambda_i$ of $H_C$ such that these eigenvalues are also the FFT of the channel, i.e., $$\begin{bmatrix} \lambda_0 \\ \lambda_1 \\ \vdots \\ \lambda_{N+N_G-1} \end{bmatrix} = F_{N+N_G} \begin{bmatrix} h_0 \\ h_1 \\ \vdots \\ h_{N+N_G-1} \end{bmatrix}$$

and the channel h is assumed to have only the first $N_G$+1 values that are non-zero,
    the OFDM symbol is obtained by padding $N_G$ zeros to the computed vector A,
    G=$G_{N+NG}$(:,1:N)$F_N^H$, where $F_{N+NG}$(:,1N) is a (N+$N_G$)×N matrix containing only the first N columns of $F_{N+NG}$, and $G_T$ is truncated according to correspond to $\Lambda_T$.

6. The method of claim 5, further comprising when N is not a power of 2, replacing N+$N_G$ with 2N.

7. The method of claim 2, wherein said obtaining further comprises providing a simplified truncated suboptimal estimator.

8. The method of claim 7, wherein the providing a simplified truncated suboptimal estimator matrix further comprises performing the calculation:

$$G_T^H \Lambda_T^{-1}$$

where $\Lambda_T$=matrix of diagonal eigenvalues of $H_C$ that has been truncated to remove null eigenvalues, $A=F_N^H a, A=[A_0 \, A_1 \ldots A_N \, 0 \ldots 0]^T$ is obtained by taking an IFFT of $a=[a_0 \, a_1 \, a_N]^T$, where IFFT is the inverse Fourier transform of the FFT of the channel H, $F_N$ is the N×N Fourier matrix $$F_L(i+1, j+1) = \frac{1}{\sqrt{N}} e^{-j2\pi ij/L} \quad i, j = 0, 1, \ldots, N-1,$$

$F_{N+N_G}$ is the Fourier matrix of dimension $N+N_G$, $\Lambda$ is a diagonal matrix of eigenvalues $\lambda_i$ of $H_C$ such that these eigenvalues are also the FFT of the channel, i.e., $$\begin{bmatrix} \lambda_0 \\ \lambda_1 \\ \vdots \\ \lambda_{N+N_G-1} \end{bmatrix} = F_{N+N_G} \begin{bmatrix} h_0 \\ h_1 \\ \vdots \\ h_{N+N_G-1} \end{bmatrix}$$

and the channel h is assumed to have only the first $N_G+1$ values that are non-zero, the OFDM symbol is obtained by padding $N_G$ zeros to the computed vector A, $G=G_{N+N_G}(:,1N)F_N^H$, where $F_{N+N_G}(:,1N)$ is a $(N+N_G) \times N$ matrix containing only the first N columns of $F_{N+N_G}$, and $G_T$ is truncated according to correspond to $\Lambda_T$.

9. The method of claim 8, further comprising when N is not a power of 2, replacing $N+N_G$ with 2N.

10. A symbol determination apparatus for a zero-prefixed OFDM systems, comprising:

a receiver configured to receive a data vector R as a transmission over a channel $H_C$ as a zero-prefixed OFDM symbol $A=[A_0 \, A_1 \ldots A_N \, 0 \ldots 0]^T$ having $N_G$ zeros, where $N_G$ is the length of a guard interval, the data vector R corresponds to a transmitted data vector $a=[a_0 \, a_1 \ldots a_N]^T$ of length N;

a frequency removal module configured to i. compute eigenvalues of the channel $H_C$ with an M-point FFT where $M=N+N_G$, and ii. remove smallest frequency values from the received vector based on the computed eigenvalues to obtain truncated received data vector $R_T$;

a symbol estimation module that estimates a transmitted symbol corresponding to the received data vector R from the truncated received data vector $R_T$ using a predetermined estimation means; and a decoder to decode the estimated symbol.

11. The apparatus of claim 10, wherein:

the frequency removal module is further configured to:

i. determine a pattern of the channel wherein, for $N_G$ eigenvalues an eigenvalue of the FFT of the channel is null when the eigenvalue satisfies a pre-specified condition for null equality, and ii. truncate the received vector R to a vector $R_T$ by omission of the $N_G$ components thereof that correspond to the determined null eigenvalues; and the symbol estimation module is further configured to:

iii. obtain a truncated suboptimal estimator matrix based on the determined pattern, and iv. estimate a by pre-multiplying the truncated vector $R_T$ by the obtained truncated suboptimal estimator matrix.

12. The apparatus of claim 11, further comprising:

a library of at least one truncated suboptimal estimator matrix having removed rows that correspond to a pattern of null eigenvalues of the FFT of the channel; and wherein the estimation module is further configured to obtain the suboptimal estimator matrix from the provided library using the determined pattern.

13. The apparatus of claim 12, wherein the library of at least one truncated suboptimal estimator matrix further comprises:

for different combinations of removed rows that form a truncated pattern T, the result of the calculation $$(G_T^H G_T)^{-1} G_T^H \Lambda_T^{-1}$$

where $\Lambda_T$=matrix of diagonal eigenvalues of $H_C$ that has been truncated to remove null eigenvalues, $A=F_N^H a, A=[A_0 \, A_1 \ldots A_N \, 0 \ldots 0]^T$ is obtained by taking an IFFT of $a=[a_0 \, a_1 \, a_N]^T$, where IFFT is the inverse Fourier transform of the FFT of the channel H, $F_N$ is the N×N Fourier matrix $$F_L(i+1, j+1) = \frac{1}{\sqrt{N}} e^{-j2\pi ij/L} \quad i, j = 0, 1, \ldots, N-1,$$

$F_{N+N_G}$ is the Fourier matrix of dimension $N+N_G$, $\Lambda$ is a diagonal matrix of eigenvalues $\lambda_i$ of $H_C$ such that these eigenvalues are also the FFT of the channel, i.e., $$\begin{bmatrix} \lambda_0 \\ \lambda_1 \\ \vdots \\ \lambda_{N+N_G-1} \end{bmatrix} = F_{N+N_G} \begin{bmatrix} h_0 \\ h_1 \\ \vdots \\ h_{N+N_G-1} \end{bmatrix}$$

and the channel h is assumed to have only the first $N_G+1$ values that are non-zero, the OFDM symbol is obtained by padding $N_G$ zeros to the computed vector A, $G=F_{N+N_G}(:,1:N)F_N^H$, where $F_{N+N_G}(:, 1:N)$ is a $(N+N_G) \times N$ matrix containing only the first N columns of $F_{N+N_G}$, and $G_T$ is truncated according to correspond to $\Lambda_T$.

14. The apparatus of claim 13, wherein when N is not a power of 2, replacing $N+N_G$ with 2N.

15. A zero-prefixed OFDM communication system comprising a plurality of communicating devices each comprising a receiver comprising an apparatus according to claim 14.

16. The apparatus of claim 11, wherein the truncated suboptimal estimator is a simplified truncated suboptimal estimator.

17. The apparatus of claim 16, wherein the estimation module is further configured to obtain the simplified truncated suboptimal estimator matrix with the calculation:

$$G_T^H \Lambda_T^{-1}$$

where
$\Lambda_T$=matrix of diagonal eigenvalues of $H_C$ that has been truncated to remove null eigenvalues,
$A=F_N^H a$, $A=[A_0 A_1 \ldots A_N 0 \ldots 0]^T$ is obtained by taking an IFFT of
$a=[a_0\ a_1\ a_N]^T$, where IFFT is the inverse Fourier transform of the FFT of the channel H,
$F_N$ is the N×N Fourier matrix $$F_L(i+1, j+1) = \frac{1}{\sqrt{N}} e^{-j2\pi ij/L}\ i, j = 0, 1, \ldots, N-1,$$

$F_{N+N_G}$ is the Fourier matrix of dimension $N+N_G$,
$\Lambda$ is a diagonal matrix of eigenvalues $\lambda_i$ of $H_C$ such that these eigenvalues are also the FFT of the channel, i.e., $$\begin{bmatrix} \lambda_0 \\ \lambda_1 \\ \vdots \\ \lambda_{N+N_G-1} \end{bmatrix} = F_{N+N_G} \begin{bmatrix} h_0 \\ h_1 \\ \vdots \\ h_{N+N_G-1} \end{bmatrix}$$

and the channel h is assumed to have only the first $N_G+1$ values that are non-zero,
the OFDM symbol is obtained by padding $N_G$ zeros to the computed vector A,
$G=F_{N+N_G}(:,1:N)F_N^H$, where $F_{N+N_G}(:,1:N)$ is a $(N+N_G)\times N$ matrix containing only the first N columns of $F_{N+N_G}$, and $G_T$ is truncated according to correspond to $\Lambda_T$.

18. The apparatus of claim 17, wherein when N is not a power of 2, replacing $N+N_G$ with 2N.

19. A zero-prefixed OFDM communication system comprising a plurality of communicating devices each comprising a receiver comprising an apparatus according to claim 18.

20. The apparatus of claim 10, wherein the OFDM symbol is an IFFT of a padded with $N_G$ zeros, the IFFT being the inverse Fourier transform of the FFT of the channel H.

21. A symbol determination apparatus for zero-prefixed OFDM systems comprising:
circuitry configured to perform
receiving a transmission over a channel $H_C$ of a data vector R as a zero-prefixed OFDM symbol $A=[A_0 A_1 \ldots A_N 0 \ldots 0]^T$ having $N_G$ zeros, where $N_G$ is the length of a guard interval;
computing eigenvalues of the channel $H_C$ with an M-point FFT where $M=N+N_G$;
removing smallest frequency values from the received vector based on the computed eigenvalues to obtain truncated received data vector $R_T$;
performing symbol estimation based on the truncated received data vector $R_T$; and
decoding the estimated symbol.

* * * * *